United States Patent
Han et al.

(10) Patent No.: US 8,891,536 B2
(45) Date of Patent: Nov. 18, 2014

(54) LAYER-3 SERVICES FOR UNITED ROUTER FARM

(75) Inventors: Lin Han, San Jose, CA (US); Renwei Li, Fremont, CA (US); Xiaoqian Wu, Beijing (CN); Shujin Zhang, Palo Alto, CA (US); Katherine Zhao, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 173 days.

(21) Appl. No.: 13/463,674

(22) Filed: May 3, 2012

(65) Prior Publication Data

US 2013/0294453 A1  Nov. 7, 2013

(51) Int. Cl.
*H04L 12/28* (2006.01)
*H04L 12/775* (2013.01)
*H04L 12/721* (2013.01)

(52) U.S. Cl.
CPC ............... *H04L 45/58* (2013.01); *H04L 45/66* (2013.01)
USPC .......................................................... 370/400

(58) Field of Classification Search
CPC ......... H04L 45/02; H04L 45/04; H04L 45/10; H04L 45/42; H04L 45/58; H04L 12/66; H04L 12/46; H04L 12/2894; H04L 2012/46; H04L 2012/5618
USPC .................................. 370/400, 401, 411, 422
See application file for complete search history.

(56) References Cited

U.S. PATENT DOCUMENTS

| | | | | |
|---|---|---|---|---|
| 6,363,319 | B1 * | 3/2002 | Hsu ............................... | 701/533 |
| 2005/0160171 | A1 * | 7/2005 | Rabie et al. ................... | 709/227 |
| 2006/0165015 | A1 * | 7/2006 | Melick et al. ................. | 370/254 |
| 2007/0036178 | A1 * | 2/2007 | Hares et al. ................... | 370/490 |
| 2010/0046532 | A1 * | 2/2010 | Okita ............................ | 370/401 |
| 2010/0220736 | A1 * | 9/2010 | Mohapatra et al. ........... | 370/401 |
| 2010/0278076 | A1 * | 11/2010 | Reddy et al. .................. | 370/254 |
| 2012/0057603 | A1 * | 3/2012 | Allan et al. ................... | 370/402 |
| 2012/0170486 | A1 * | 7/2012 | Mohapatra et al. ........... | 370/254 |
| 2012/0182996 | A1 * | 7/2012 | Aggarwal et al. ............. | 370/392 |
| 2012/0218916 | A1 * | 8/2012 | Ashwood-Smith ........... | 370/254 |
| 2013/0003729 | A1 * | 1/2013 | Raman et al. ................. | 370/389 |

* cited by examiner

*Primary Examiner* — Gary Mui
*Assistant Examiner* — Kabir Jahangir

(57) ABSTRACT

One embodiment of the present invention provides a computing system. The computing system includes a processor, a memory, a logical switch management mechanism, and a layer-2 path management mechanism. The logical switch management mechanism operates the computing system in conjunction with a plurality of remote switches as a single logical switch. The layer-2 path management mechanism includes a path calculation mechanism and a layer-2 forwarding table. The path calculation mechanism calculates layer-2 shortest paths among the computing system and the remote switches. The layer-2 forwarding table is for a first switch in the plurality of remote switches and created based on one or more of the shortest paths, wherein a respective entry in the forwarding table corresponds to a layer-2 network address. The layer-2 path management mechanism suppresses advertisement of the shortest paths outside of the logical switch, thereby hiding internal paths of the logical switch.

18 Claims, 12 Drawing Sheets

LAYER-3 SERVICES FOR UNITED ROUTER FARM

BACKGROUND

1. Field

The present disclosure relates to network management. More specifically, the present disclosure relates to a method and system for packet forwarding in a virtualized network with a centralized point of control.

2. Related Art

The relentless growth of the Internet has brought with it an insatiable demand for bandwidth. As a result, equipment vendors race to build larger, faster, and more versatile routers to move traffic, especially in the core networks. In a traditional mode of operation, such a router has a control plane and a data plane. The router is typically controlled by local software which implements the control and data planes. The router communicates with other routers through predefined protocols. The control plane configures the forwarding information on the router and distributes control information (e.g., routing cost), and the data plane forwards data packets according to the forwarding information. However, each individual router requires tedious and complex configuration, typically performed by a network administrator. Hence, accessing and configuring such information remotely and automatically can improve the management of a router, thereby addressing one of the most challenging problems in today's networking paradigm.

Remotely gaining access to a router's control plane can address some aspects of this problem. For example, Open-Flow is a protocol that allows configuring some routing policies, such as setting up a forwarding path, by software running on a separate server. However, OpenFlow only defines the flow table message for an OpenFlow switch, and does not provide sufficient infrastructure to control a router completely.

Hence, while remotely configuring network paths on a router brings many desirable features to layer-3 networks, some issues remain unsolved for packet forwarding among a group of routers with a centralized point of control.

SUMMARY

One embodiment of the present invention provides a computing system. The computing system includes a processor, a memory, a logical switch management mechanism, and a layer-2 path management mechanism. The logical switch management mechanism operates the computing system in conjunction with a plurality of remote switches as a single logical switch. The layer-2 path management mechanism includes a path calculation mechanism and a layer-2 forwarding table. The path calculation mechanism calculates layer-2 shortest paths among the computing system and the remote switches. The layer-2 forwarding table is for a first switch in the plurality of remote switches and created based on one or more of the shortest paths, wherein a respective entry in the forwarding table corresponds to a layer-2 network address. The layer-2 path management mechanism suppresses advertisement of the shortest paths outside of the logical switch, thereby hiding internal paths of the logical switch.

In a variation on this embodiment, the computing system also includes a data management mechanism which sends the layer-2 forwarding table to the first switch.

In a variation on this embodiment, the computing system also includes a forwarding mechanism which forwards a received packet to a switch in the plurality of remote switches based on the layer-2 forwarding table.

In a variation on this embodiment, the path management mechanism uses the Intermediate System to Intermediate System (IS-IS) protocol while calculating the one or more layer-2 shortest paths.

In a variation on this embodiment, the layer-2 path management mechanism also updates a respective entry in the layer-2 forwarding table in response to a change in the logical switch.

In a variation on this embodiment, the computing system also includes a layer-3 route management mechanism which maps a respective layer-2 network address in the layer-2 forwarding table to a layer-3 network address.

In a further variation on this embodiment, the layer-3 route management mechanism also sends mapping information to the first switch.

In a further variation on this embodiment, the layer-3 route management mechanism also creates a local layer-3 forwarding table based on the mapping and a local layer-2 forwarding table.

In a further variation on this embodiment, the layer-3 route management mechanism also updates a respective entry in the local layer-3 forwarding table in response to a change in the local layer-2 forwarding table.

One embodiment of the present invention provides a switch. The switch includes a configuration management mechanism, a logical switch management mechanism, and a data management mechanism. The configuration management mechanism configures the switch based on received configuration information from a remote system, thereby allowing the remote system to control the switch. The logical switch management mechanism operates the switch in conjunction with a plurality of remote switches as a single logical switch based on the received configuration information. The data management mechanism receives a layer-2 forwarding table from the remote system, wherein a respective entry in the forwarding table corresponds to a layer-2 network address and suppresses advertisement of the forwarding table outside of the logical switch, thereby hiding internal forwarding of the logical switch.

In a variation on this embodiment, the switch also includes a forwarding mechanism which forwards a received packet to a switch in the plurality of remote switches based on the layer-2 forwarding table.

In a variation on this embodiment, the data management mechanism also receives an updated layer-2 forwarding table from the configuring system.

In a variation on this embodiment, the data management mechanism also receives a mapping between a respective layer-2 network address in the layer-2 forwarding table and a layer-3 network address from the configuring system.

In a further variation on this embodiment, the switch also includes a layer-3 route management mechanism which creates a layer-3 forwarding table based on the mapping and the layer-2 forwarding table.

In a further variation on this embodiment, the layer-3 route management mechanism also updates a respective entry in the layer-3 forwarding table in response to a change to the layer-2 forwarding table.

DETAILED DESCRIPTION

Figure 1A:
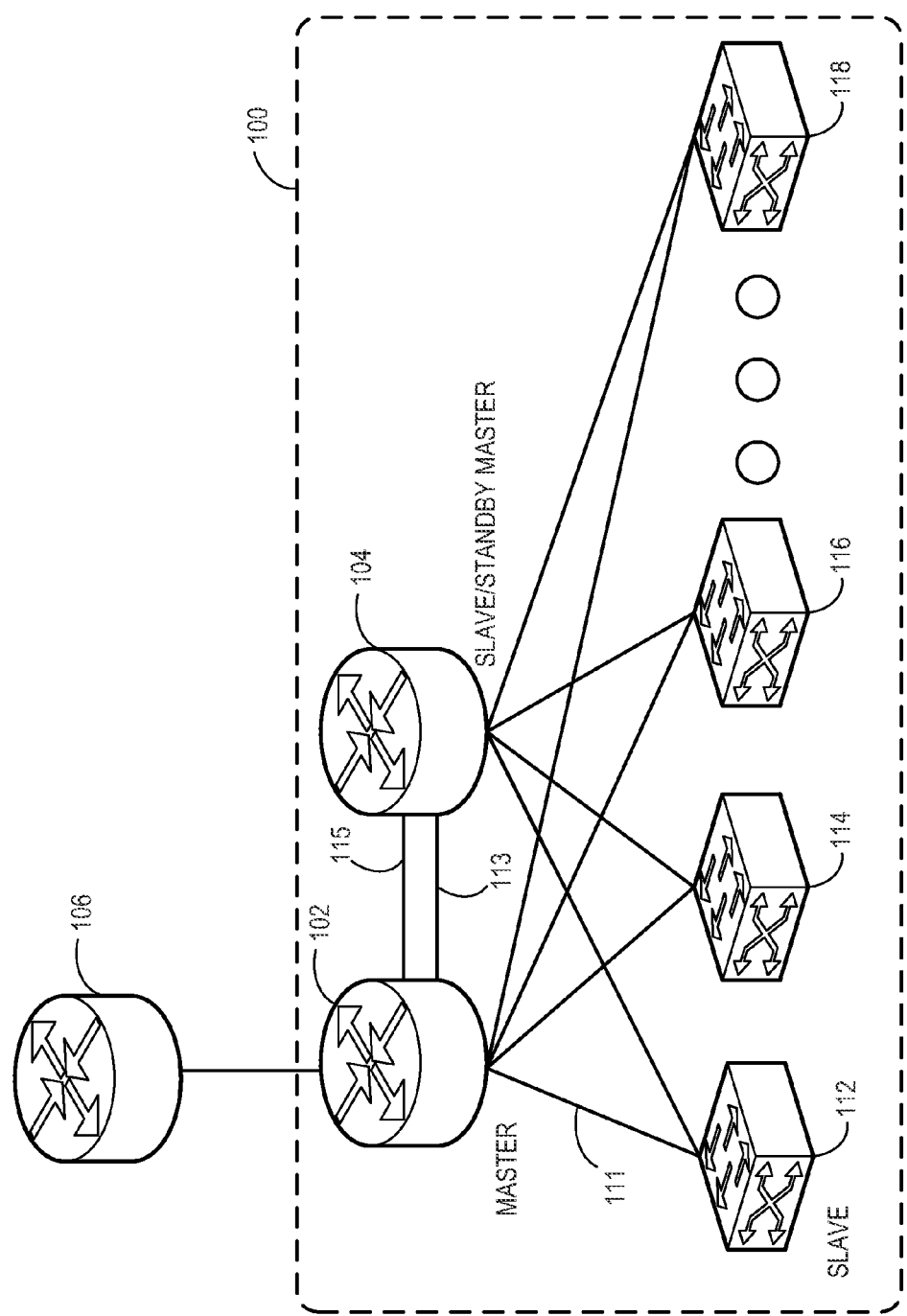
FIG. 1A illustrates an exemplary United Router Farm (URF) in a hub-spoke topology, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of efficiently providing layer-3 services in a network is solved by incorporating layer-3 connectivity using layer-2 connectivity established by a centralized point of control. Layer-3 services (e.g., Internet Protocol (IP) services) are very important in modern data communication because such services are prevailing in every area of networking, from residential wireless networks to the Internet. Layer-3 services typically provide flexibility and scalability to different classes of traffic. However, in a traditional network, designing and provisioning layer-3 services is complex because a respective router requires individual configurations, such as address assignment for a respective interface in the router, and routing protocol selection and configuration. For a large and dynamic network, in which the network topology changes due to the addition of new routers, new links, new services, etc., configuring individual routers can be complex and tedious. Consequently, plug-and-play services are harder to incorporate in such a network.

On the other hand, a layer-2 network (e.g., Ethernet) can more readily facilitate plug-and-play services. A typical layer-2 switching protocol does not require complex configurations. Because a respective interface on a layer-2 switch has a default layer-2 network address (e.g., a media access control (MAC) address), the interface does not require any address configuration. Furthermore, layer-2 switching does not rewrite the layer-2 header of a packet, resulting in a lighter load on hardware and a better performance. However, a layer-3 network can provide more flexibility to an application than a layer-2 network can. For example, transport layer data communication, such as transmission control protocol (TCP) or user datagram protocol (UDP), can only be established through layer-3 services.

To solve this problem, a composite network with an arbitrary number of routers or switches, called a united router farm (URF), can be created and virtualized as one logical router or switch. In a URF, a network switch or router, called a node, can be dynamically added or removed like a layer-2 device without changing any layer-3 services provided to the node. Hence, the URF combines the advantages of both layer-2 and layer-3 networks through network virtualization. The virtualization essentially offloads the control plane of all routers in the URF to a unified location which provides a new centralized single point of control and management. Such a unified management location can be on any router in the URF or an external network management system (e.g., a server). The router or server which provides the centralized point of control and management can be referred to as the master node, while all other routers or switches in the URF can be referred to as slave nodes. This mode of operation is referred to as a master-slave mode.

In some embodiments, under the master-slave mode, a URF can have a plurality of master nodes. During regular operation, only one such node operates as the master node in the URF, while the others work as slave nodes and remain on standby. If the master node fails, one of the standby master nodes becomes the master node for the URF. The master nodes in a URF can be of different types. For example, one of the master nodes in a URF can be a router, while another one can be a server. In some embodiments, a URF can include one or more aggregation routers, wherein one of the aggregation routers acts as the master node, while others act as slave nodes. The rest of the routers in a URF can be access switches acting as slave nodes. In a traditional network, access switches only provide layer-2 switching, whereas aggregation routers provide both layer-2 switching and layer-3 routing services. However, after the virtualization (i.e., after forming the URF), the URF provides both layer-2 and layer-3 services as a whole. Consequently, any packet received by an access switch can receive both layer-2 and layer-3 services from the URF.

A master node in a URF controls the slave nodes. A respective slave node registers with the master node and becomes a part of the URF. All nodes in a URF are coupled to each other via layer-2. Information about all aspects of the URF, such as network topology and configurations of a respective slave node, resides on the master node. In some embodiments, the master node uses this information to calculate shortest paths in the layer-2 network among all nodes in the URF and creates a layer-2 forwarding table. The master node distributes this table to all slave nodes. The master node also assigns layer-3 network addresses (e.g., IP addresses) to a respective slave node and distributes these addresses to all slave nodes as well.

Using the layer-2 forwarding table and the layer-3 network addresses, a respective slave node in the URF can generate a local layer-2 switching table and a local layer-3 forwarding table. Hence, the layer-3 services can be provided in the URF without running layer-3 routing protocols and configurations.

Since the nodes in the URF are virtualized as one logical router, the internal network topology and all paths within the URF are hidden from outside of the URF. As a result, any protocol running for the internal network of the URF does not exchange route information with any node outside of the URF. In other words, a router in the URF completely separates any protocol configured for the "virtualized router" and any protocol (e.g., a routing protocol) that interoperates with the neighbors of the "virtualized router." Such a separation can be implemented by using different instances or different processes of the protocol stack in a respective node in the URF.

In some embodiments, a respective node in the URF has a Network Service Access Point (NSAP) address, as specified in International Organization for Standards (ISO) International Standard ISO/IEC 8348 titled "Information technology—Open Systems Interconnection—Network service definition," which is incorporated by reference herein. Typically, an NSAP address has fields for specifying domain and area of a network. For a URF, the NSAP address of a respective node has the same value for the domain and area. The address further incorporates a media access control (MAC) address of the node. As a result, a respective NSAP address remains unique in the URF. The master node of the URF calculates the shortest path using the Intermediate System to Intermediate System (IS-IS) protocol, wherein all nodes in the URF are in the same IS-IS level. The shortest paths are calculated using "link costs" between nodes. The link cost can be reverse-proportional to the bandwidth on the link. If more than one links with the same cost couple the same nodes, these links can be bundled together as one logical link to break the tie.

In this disclosure, the terms "switch" and "router" are used interchangeably, and refer to any device forwarding traffic in a network. The terms should not be interpreted as being limited to a layer-2 or layer-3 network. The term "node" is used in a generic sense and can refer to a switch or a router.

The terms "master" and "slave" are used in a generic sense. Any entity in a network which controls other network entities can be referred to as a master node. Similarly, any entity in a network which is controlled by another network entity can be referred to as a slave node. The terms "master" and "master node," and "slave" and "slave node" are used interchangeably, respectively.

The term "image" refers to data stored in a nonvolatile and distributable form which represents a complete computing device or software controlling the computing device (e.g., an operating system). In this disclosure, any data or software that can operate a network switch or router and can be distributed across a network can be referred to as an image. The image can simply be one or more files that can contain an operating system, executable programs, and any data files that might be related to the operating system and programs.

The terms "frame" or "packet" refer to a group of bits that can be transported together across a network. "Frame" should not be interpreted as limiting embodiments of the present invention to layer-2 networks. "Packet" should not be interpreted as limiting embodiments of the present invention to layer-3 networks. "Frame" or "packet" can be replaced by other terminologies referring to a group of bits, such as "cell" or "datagram."

The term "network address" refers to an identifier that can identify a device in a network. A "network address" should not be interpreted as limiting embodiments of the present invention to IP network addresses. "Network address" can be replaced by other terminologies referring to an identifier of a device in a network, such as "name" or "identifier."

Network Architecture

FIG. 1A illustrates an exemplary United Router Farm (URF) in a hub-spoke topology, in accordance with an embodiment of the present invention. URF 100 includes a master node 102 and a standby master node 104. Both nodes 102 and 104 are configured to operate as a master node, but only node 102 acts as the master node for URF 100. In some embodiments, a priority value is assigned to nodes 102 and 104, and the node with the higher value acts as the master while the other remains on standby. In this example, node 102 has the highest priority value. During operation, if node 102 encounters a failure, node 104 start operating as a master node. URF 100 also includes a large number of slave nodes 112, 114, 116, and 118. A respective slave node is coupled to both nodes 102 and 104. In some embodiments, nodes 102 and 104 are aggregation routers with layer-3 routing capability, while nodes 112, 114, 116, and 118 are layer-2 access switches. URF 100 can be presented as one logical layer-3 router to the rest of the network. For example, URF 100 appears as one logical layer-3 router to node 106 coupled to node 102. Because of the combination of aggregation and access switches, URF 100, as a logical router, can operate in both layer-2 and layer-3. Note that a master node image is typically installed on nodes 102 and 104 by a system administrator. On the other hand, a respective slave node, such as node 112, typically has a basic slave image preinstalled for enabling node 112 to join URF 100.

During operation, master node 102 in URF 100 remotely controls slave node 112 using the MSC method. During operation, master node 102 first discovers slave node 112. The discovery can be initiated from either master node 102 or slave node 112. After the discovery, slave node 112 registers with master node 102 and becomes a part of URF 100. During this registration process, master node 102 can send a slave image to slave node 112. Slave node 112 installs the image locally. Once the slave image is installed, master node 102 then configures slave node 112, and continues to control and monitor slave node 112 as long as slave node 112 is a part of URF 100. Similarly, master node 102 registers and configures slave nodes 114, 116, and 118 as well. In addition, master node 102 periodically checks whether the slave nodes are alive. A respective slave node also periodically checks whether master node 102 is alive. During operation, if node 104 detects that master node 102 is not alive, node 104 can start operating as the master node for URF 100. All nodes in URF 100 are coupled to each other via layer-2. Master node 102 knows the network topology of URF 100 and configurations of a respective slave node.

Since the nodes in URF 100 are virtualized as one logical router, the internal network topology and all internal paths are hidden to outside of the URF, such as node 106. As a result, any protocol running on node 102 for URF 100 does not exchange route information with node 106. In other words, node 102 completely separates any protocol configured for URF 100 and any protocol (e.g., a routing protocol) that interoperates with node 106. For example, node 102 does not share its information on links to nodes 104, 112, 114, 116, and 118 with node 106. Such a separation can be implemented by using different instances or different processes of the protocol stack in node 102.

In some embodiments, all nodes in URF 100 have an NSAP address. All such NSAP addresses in URF 100 can have the same value for the domain and area. For example, the NSAP address for node 102 can have the same value for domain and area as in the NSAP address for node 104. The NSAP address for node 102 can further incorporate a MAC address of node 102, which is unique. As a result, the NSAP address of node 102, including the domain, area, and MAC address, becomes unique in the URF. Similarly, nodes 104, 112, 114, 116, and 118 have unique NSAP addresses as well.

Master node 102 in URF 100 calculates the shortest path among all nodes in URF 100 using IS-IS protocol, wherein all nodes in URF 100 are in the same IS-IS level. The shortest paths in URF 100 are calculated using "link costs" between nodes. The link cost can be reverse-proportional to the bandwidth on the link. For example, if the bandwidth of link 111 is X bps, then the cost of link 111 can be N*1/X, wherein N is a number larger than the maximum single link or trunk bandwidth in URF 100. If more than one link with the same cost couples the same nodes, all links can be bundled together as one logical link to break the tie. For example, if links 113 and 115 coupling nodes 102 and 104 have the same cost, then one way to break the tie can be to form a logical trunk link between nodes 102 and 104 using links 113 and 115.

In some embodiments, after creating shortest paths among all nodes, master node 102 creates a layer-2 forwarding table for slave node 112 and sends this table to slave node 112. The forwarding table includes shortest paths from node 112 to all other nodes in URF 100, wherein a respective entry in the table is identified using a layer-2 identifier. Master node 102 also creates similar layer-2 forwarding tables for all other nodes. Using the layer-2 forwarding table, slave node 112 then generates a local layer-2 switching table. Master node 102 also assigns layer-3 network addresses (e.g., IP addresses) to all slave nodes in URF 100 and distributes these addresses to all slave nodes as well. For example, slave node 112 receives the layer-3 network addresses of all nodes in URF 100. Using these layer-3 network addresses, slave node 112 generates a local layer-3 forwarding table from the local switching table. Hence, master node 102 can provide layer-3 services in URF 100 without running layer-3 routing protocols and configurations.

Figure 1B:
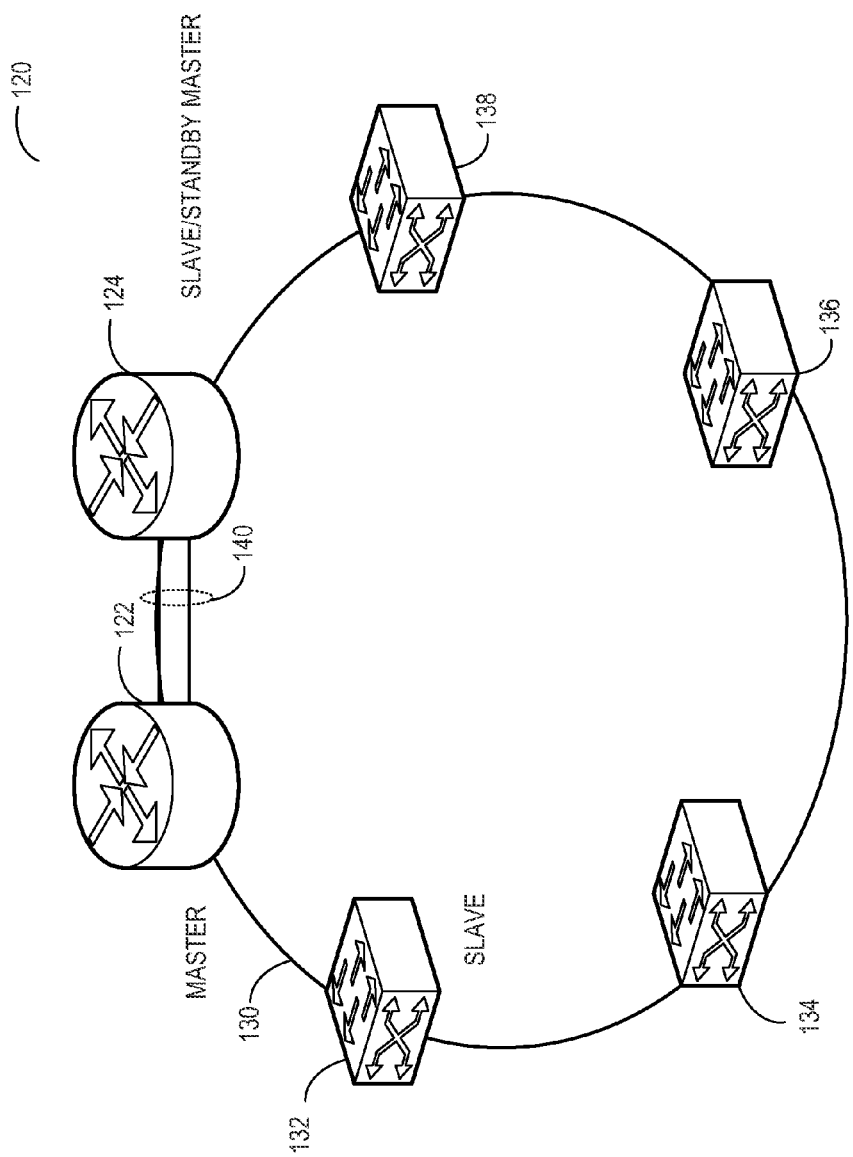
FIG. 1B illustrates an exemplary URF in a ring topology, in accordance with an embodiment of the present invention.

The network topology of a URF is typically designed to meet the service requirements of the whole URF and achieve the desired performance, availability, and scalability from the network. Hence, a URF can have different topologies, depending on design and implementation. FIG. 1B illustrates an exemplary URF in a ring topology, in accordance with an embodiment of the present invention. In this example, URF 120 includes a master node 122, a standby master node 124, and slave nodes 132, 134, 136, and 138. All nodes in URF 120 are coupled to each other via a ring 130. Because node 124 is the standby master node, nodes 122 and 124 are coupled to each other via multiple links 140. In some embodiments, one of the links 140 is used as a part of ring topology 130, while the other ones are used to update the master node states on node 124. In this way, node 124 remains prepared to take over the operations of node 122 in a failure scenario without interrupting regular traffic in URF 120. Though ring 130 is shown using a single line, it can consist of multiple parallel rings, designed to resume operation in case of a link failure.

Figure 1C:
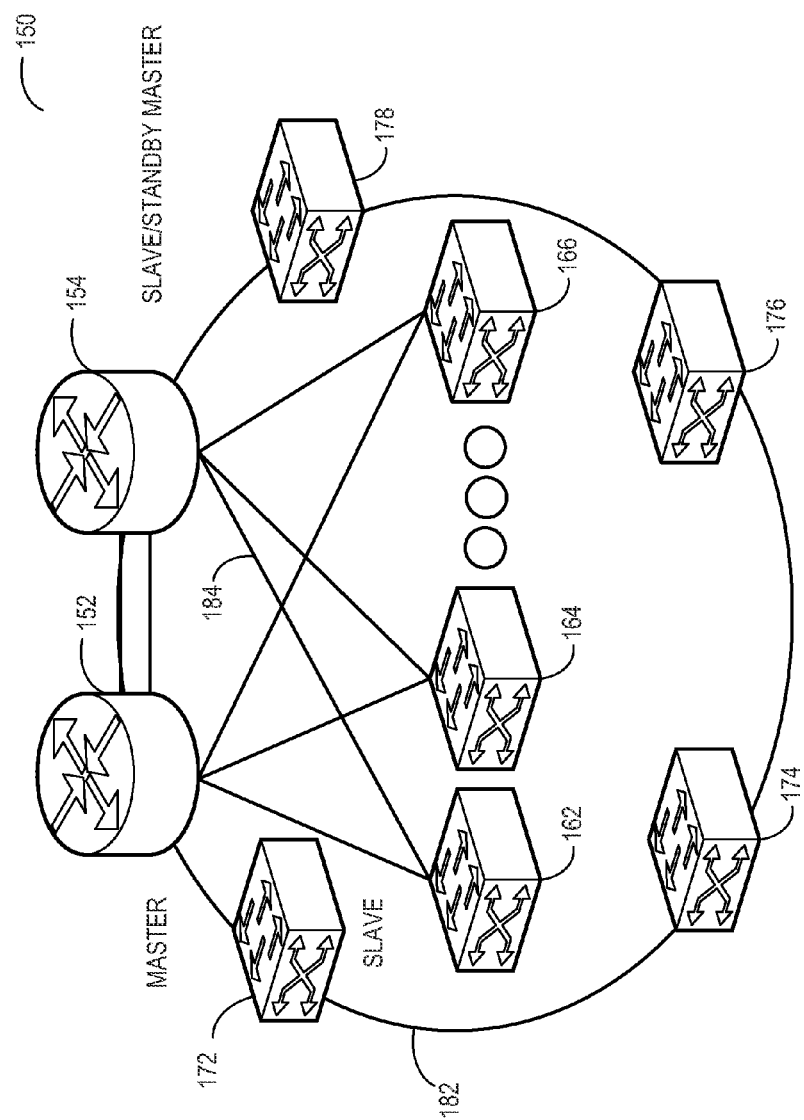
FIG. 1C illustrates an exemplary URF in a hybrid topology, in accordance with an embodiment of the present invention.
Figure 1D:
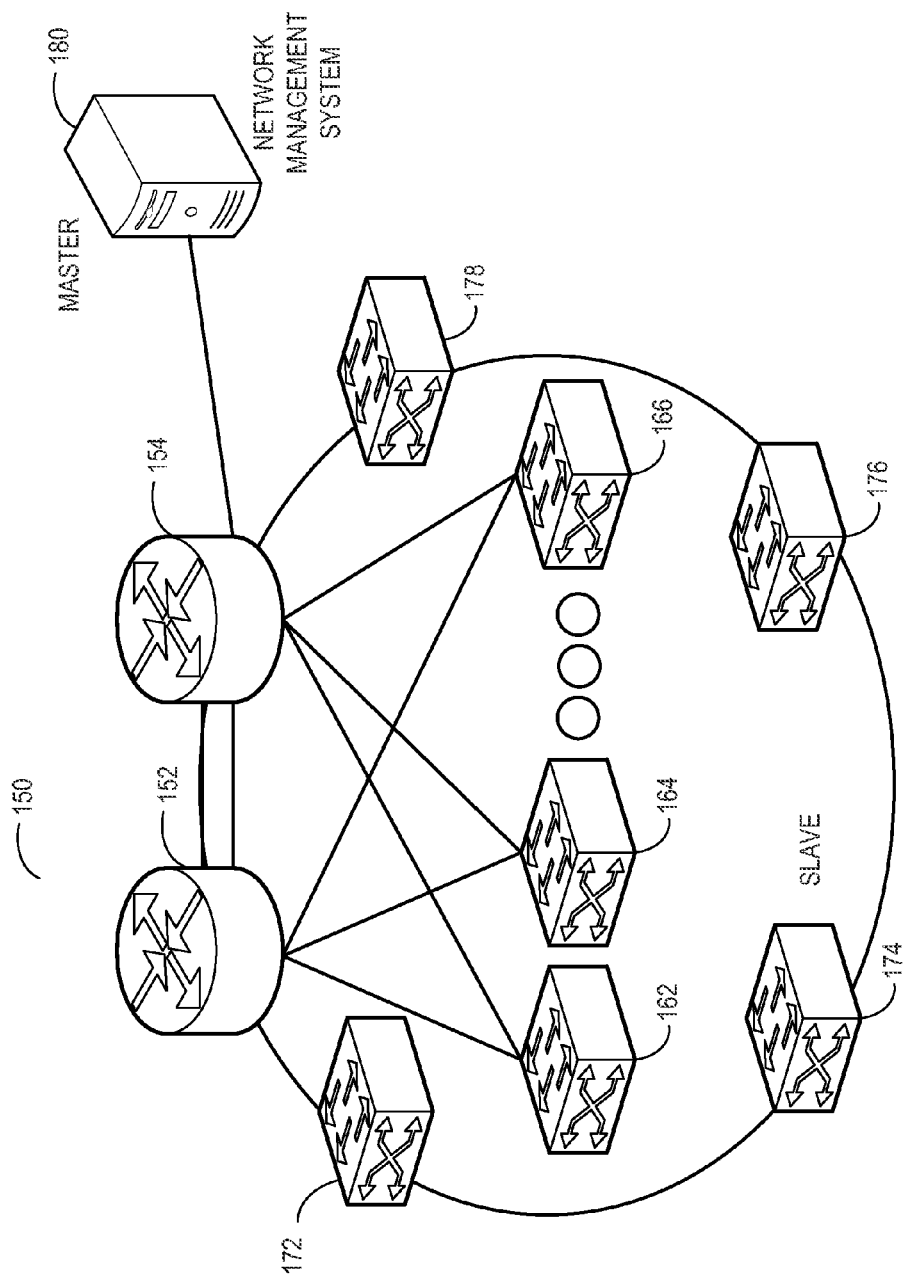
FIG. 1D illustrates an exemplary URF controlled by a network management system, in accordance with an embodiment of the present invention.

FIG. 1C illustrates an exemplary URF in a hybrid topology, in accordance with an embodiment of the present invention. In this example, URF 150 includes a master node 152 and a standby master node 154 acting as a slave node. Slave nodes 172, 174, 176, and 178 are coupled to nodes 152 and 154 in a ring topology 182. Moreover, slave nodes 162, 164, and 166 are coupled to nodes 152 and 154 in a spur topology. FIGS. 1A-1C illustrate that, irrespective of the topology, a URF has one master node which virtualizes the URF as one logical router, and configures and controls the rest of the nodes in the URF. In some embodiments, the master node can be a separate network management system. FIG. 1D illustrates an exemplary URF controlled by a network management system, in accordance with an embodiment of the present invention. All nodes in FIG. 1D are the same as in FIG. 1C, so the same numerals are used to denote them. In this example, network management system 180 operates as the master node for URF 150 while nodes 152 and 154 act as standby master nodes. Network management system 180 may not participate in the data plane of URF 150 or forward data packets. However, system 180 manages the control plane and controls the nodes in URF 150.

United Router Farm Formation

To form a URF, a system administrator can configure a master node. The administrator can optionally configure additional standby master nodes as well. Whenever a slave node joins the URF, the master node exchanges MSC messages with the slave node to register and configure the slave node. In this way, a large number of slave nodes can join the URF, thereby forming the URF using the MSC method. At the different stages of the MSC method, a combination of layer-2 (e.g., Ethernet) and layer-3 (e.g., Internet Protocol (IP)) communication is used for the message exchange. For IP-based communication, the MSC messages can be transported either using Transmission Control Protocol (TCP) or User Datagram Protocol (UDP). During the initial stages of the message exchanges (e.g., registration messages), a slave node communicates with the master node using layer-2 frames until the slave node is accepted as a member of the URF. Thereafter, depending on the transportation mode of the slave node, either layer-2 or layer-3 communication is used for the transportation of all MSC messages.

Figure 2:
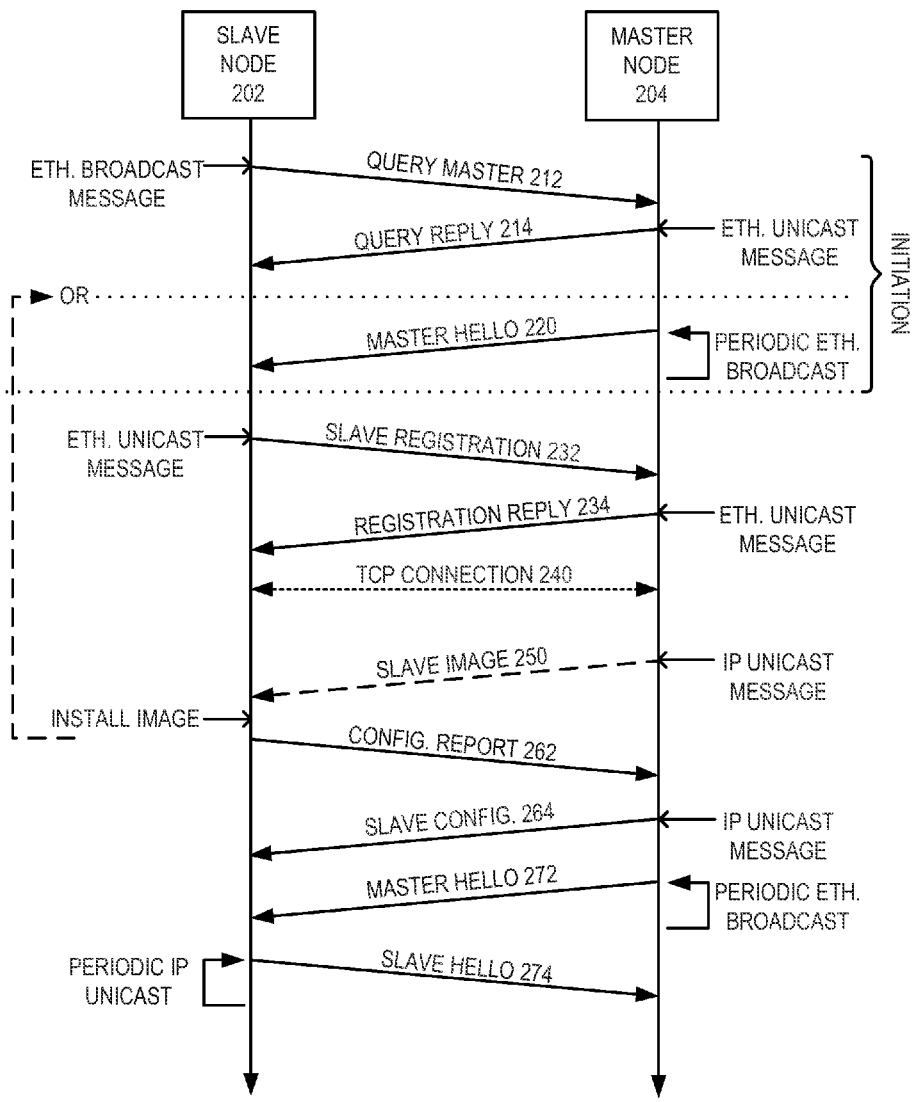
FIG. 2 illustrates an exemplary communication for a slave node registering with a master node, in accordance with an embodiment of the present invention.

FIG. 2 illustrates an exemplary communication for a slave node registering with a master node, in accordance with an embodiment of the present invention. During operation, a slave node 202 registers with a master node 204. If the registration process is initiated by slave node 202, it broadcasts a query master message 212 in a URF via Ethernet. Upon receiving the message, master node 204 learns a layer-2 address of the slave node and sends a query reply message 214 via Ethernet unicast. On the other hand, master node 204 periodically broadcasts a hello message 220 in the URF via Ethernet. If slave node 202 receives hello message 220 before sending query master message 212, the registration process is considered to have been initiated by master node 204.

When slave node 202 receives either query reply message 214 or master hello message 220, slave node 202 learns the layer-2 address of master node 204 and sends a slave registration message 232 to master node 204 via Ethernet unicast. Upon receiving slave registration message 232, master node 204 sends a registration reply message 234 containing an IP address for slave node 202 via Ethernet unicast. Master node 204 can also include a Virtual Local Area Network (VLAN) identifier in message 234. Master node 204 can optionally establish a TCP connection 240 with slave node 202. Depending on the current slave image in slave node 202, master node 204 sends a slave image 250 to slave node 202 via IP unicast. Upon receiving the image, slave node 202 installs the image, reboots, and initiates the registration process again. However, if the image does not require installation or updating, slave node 202 reports its current configuration to master node 204 via configuration report message 262 (which can also be a data report message) via IP unicast. Upon receiving the message, master node 204 sends a configuration to slave node 202 in slave configuration message 264 via IP unicast. Master node 204 also periodically broadcasts a hello message 272 in the URF via Ethernet to notify all slave nodes that it is alive. Similarly, slave node 202 periodically sends a hello message 274 via IP unicast to master node 204 to notify master node 204 that slave node 202 is alive.

Layer-2 Forwarding Table

Figure 3:
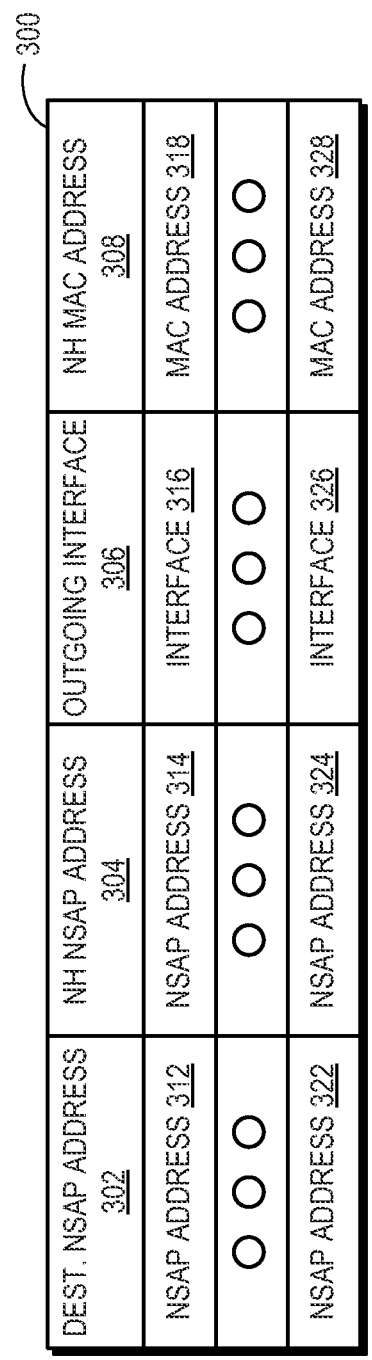
FIG. 3 illustrates an exemplary layer-2 forwarding table, in accordance with an embodiment of the present invention.

FIG. 3 illustrates an exemplary layer-2 forwarding table, in accordance with an embodiment of the present invention. A master node in a URF creates a layer-2 forwarding table 300 for a respective node in the URF. The master node first calculates the shortest path from the node to all other nodes (referred to as destination nodes), and identifies the next-hop node for a respective destination node. Typically, table 300 contains an entry for a respective destination node identified by a destination NSAP address 302, a corresponding next-hop node identified by a next-hop NSAP address 304, an outgoing interface 306 that couples the node to the next-hop node, and a MAC address 308 of the next-hop node. For example, if NSAP address 312 identifies a node in the URF, then the next-hop node has an NSAP address 314 and a MAC address 318, and can be reached via interface 316. Similarly, if NSAP address 322 identifies another node in the URF, then the next-hop node has an NSAP address 324 and a MAC address 328, and can be reached via interface 326. Once table 300 is populated for the node in the URF, the node can send a packet to any destination node via the shortest path by sending the packet to the next-hop node via the corresponding interface.

Figure 4A:
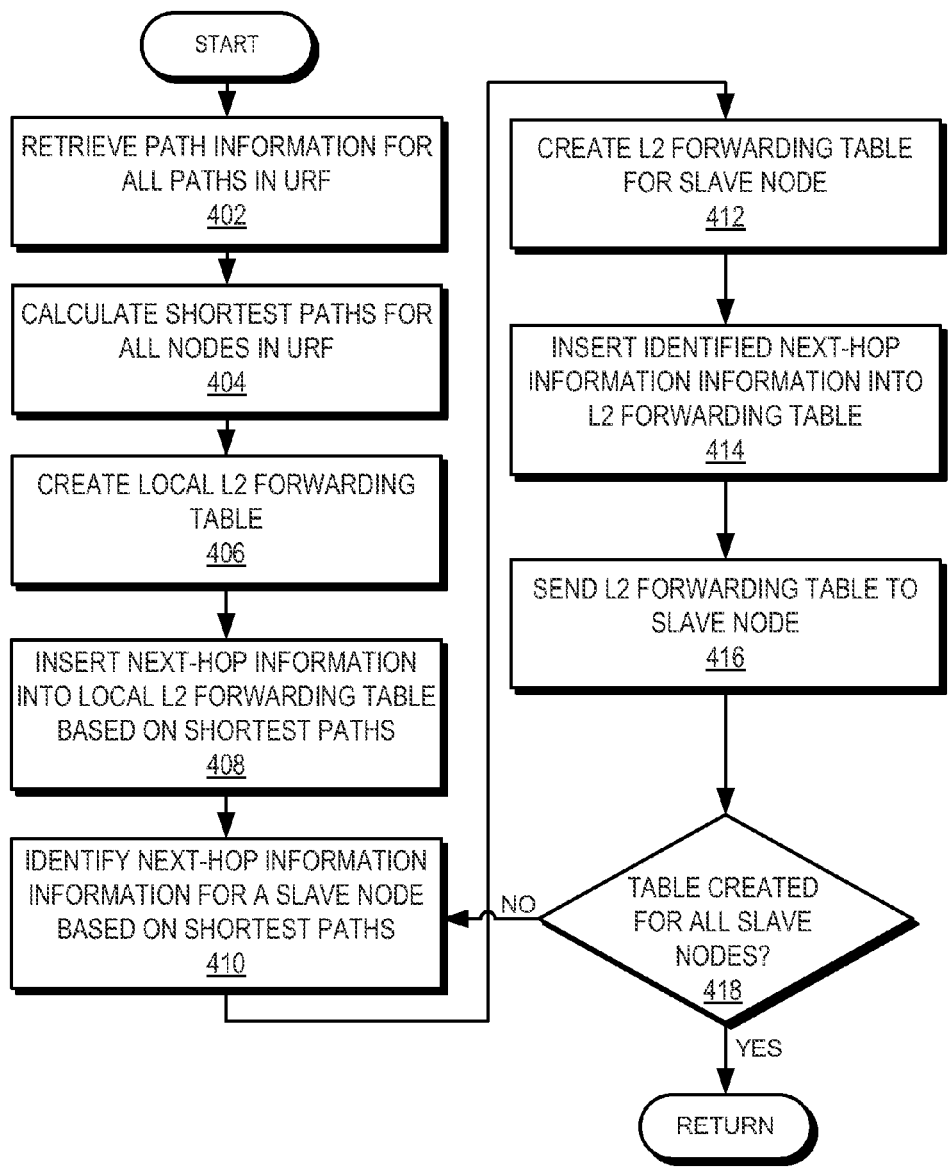
FIG. 4A presents a flowchart illustrating the process of a master node creating and distributing layer-2 forwarding tables, in accordance with one embodiment of the present invention.

FIG. 4A presents a flowchart illustrating the process of a master node creating and distributing layer-2 forwarding tables, in accordance with one embodiment of the present invention. The master node first retrieves path information, such as path bandwidth and corresponding path cost, for all paths coupling all nodes in the URF (operation 402). Based on the path information, the master node calculates the shortest path from a respective node to all other nodes (operation 404). In some embodiments, the shortest path is calculated using the IS-IS protocol. The shortest paths can be calculated based on any shortest-path calculation algorithm for a graph. Upon calculating the shortest paths, the master node creates a local layer-2 forwarding table (i.e., a layer-2 forwarding table for the master node) (operation 406) and inserts the next-hop information, as described in conjunction with FIG. 3, for all slave nodes as destinations into the layer-2 forwarding table based on the shortest paths (operation 408).

The master node then identifies next-hop information based on the shortest paths for a slave node (operation 410). Upon identifying the information, the master node creates a layer-2 forwarding table for the slave node (operation 412) and inserts the next-hop information for all other nodes as destinations into the layer-2 forwarding table (operation 414). The master node then sends the layer-2 forwarding table to the corresponding slave node (operation 416). The master node checks whether it has created layer-2 forwarding tables for all nodes in the URF (operation 418). If not, the master node identifies next-hop information for another node (operation 410). Otherwise, the master node has completed the process.

Figure 4B:
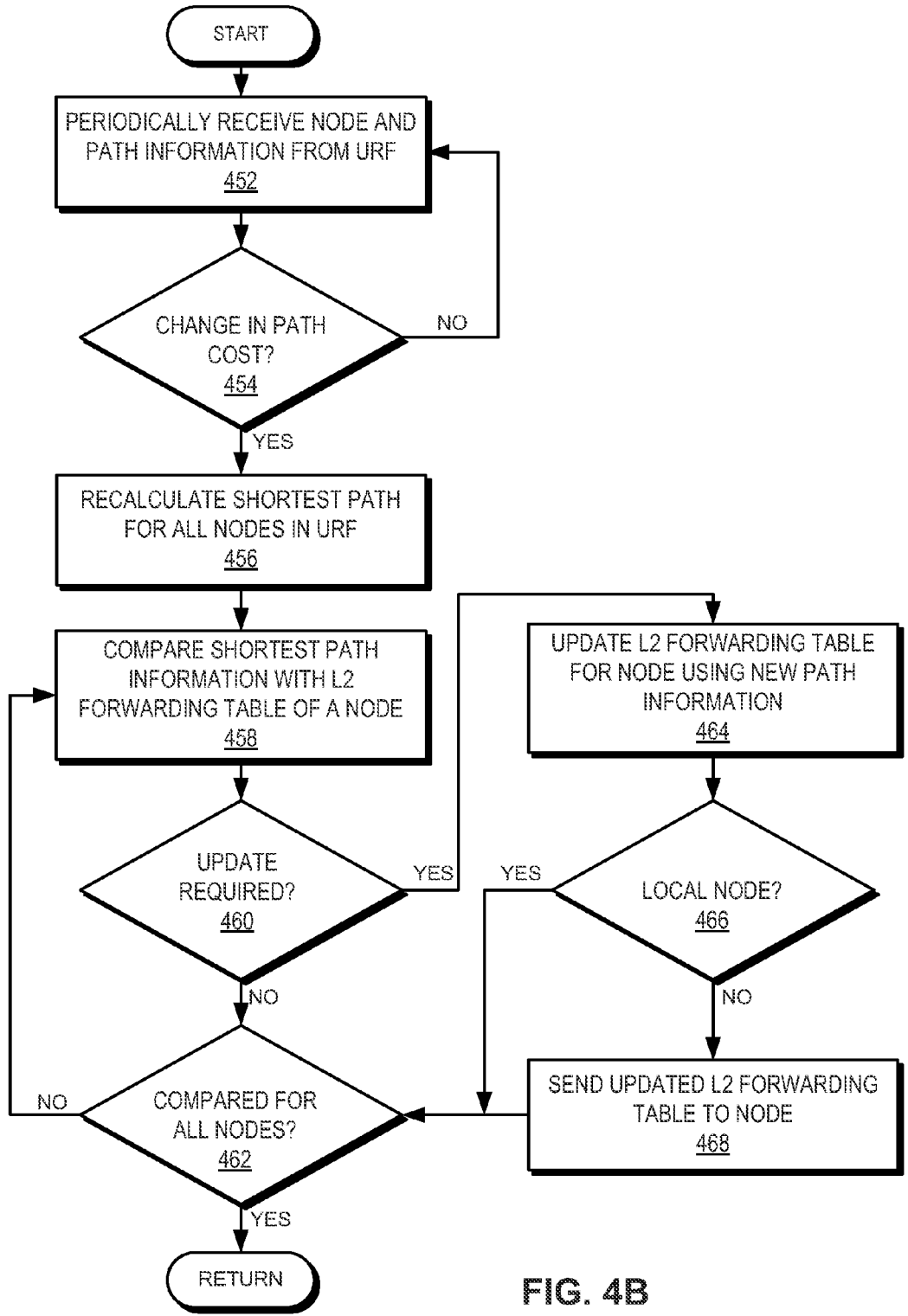
FIG. 4B presents a flowchart illustrating the process of a master node updating layer-2 forwarding tables, in accordance with one embodiment of the present invention.

FIG. 4B presents a flowchart illustrating the process of a master node updating layer-2 forwarding tables, in accordance with one embodiment of the present invention. The master node periodically receives node and path information from the URF (operation 452). Such information can indicate whether a node or a link is active. The master node checks whether there is any change in the path cost (operation 454). For example, if a node or a link fails, the corresponding path cost can increase to infinite, indicating the failure. If there is no change, then the master node continues to receive node and path information (operation 452). Otherwise, the master node recalculates the shortest paths for all nodes in the URF (operation 456) and compares the newly calculated shortest path information with the layer-2 forwarding table of a node (operation 458). Such comparison can include checking whether a new shortest path has led to a new next-hop node for the node. Based on the comparison, if any update is required to the layer-2 forwarding table (operation 460), the master node updates the forwarding table using the new path information (i.e., new next-hop node corresponding to the new shortest path) (operation 464). The master node then checks if the update is for the local (i.e., the master) node (operation 466). If not, then the master node sends the updated layer-2 forwarding table to the node (operation 468). If the update is for the local node (operation 466) or no update is required for the table (operation 460), the master node checks whether it has compared new shortest paths with the layer-2 forwarding table of all nodes in the URF (operation 462). If not, the master node compares new shortest path information with the layer-2 forwarding table of another node (operation 458). Otherwise, the master node has completed the process.

Layer-3 Implementation

Figure 5:
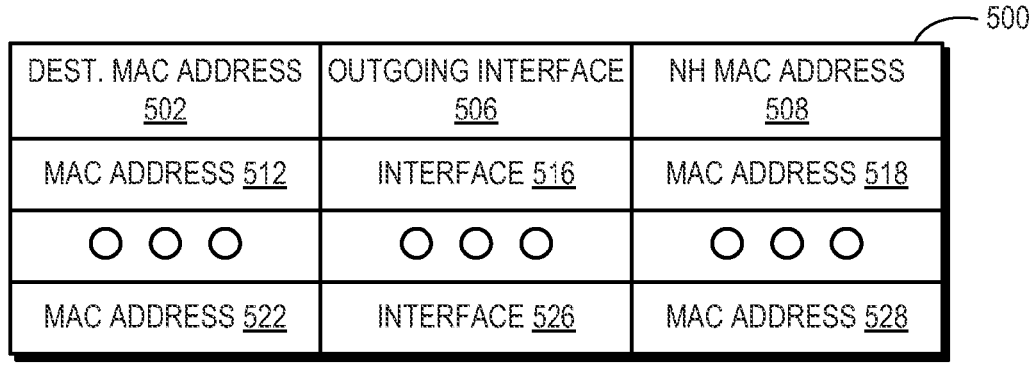
FIG. 5 illustrates an exemplary switching table, in accordance with an embodiment of the present invention.

FIG. 5 illustrates an exemplary switching table, in accordance with an embodiment of the present invention. A respective node in a URF can retrieve the MAC address part from a respective NSAP address from a layer-2 forwarding table and replace the destination NSAP addresses with corresponding MAC addresses to generate a switching table. Switching table 500 on a respective node can be used for layer-2 switching at the node. For example, outgoing interface 506 of destination MAC address 502 can be used for Ethernet switching. However, next-hop MAC address 508 is not used for layer-2 switching. Instead it can be used for deployment of layer-3 services in the URF, which is further elaborated in conjunction with FIG. 6B. If MAC address 512 corresponds to a node in the URF, then the next-hop node has a MAC address 518, and can be reached via interface 516. Similarly, if MAC address 522 corresponds to another node in the URF, then the next-hop node has a MAC address 528, and can be reached via interface 526. Once table 500 is populated for the node in the URF, the node can perform layer-2 switching via the shortest path by sending a frame to the next-hop node via the corresponding interface.

Figure 6A:
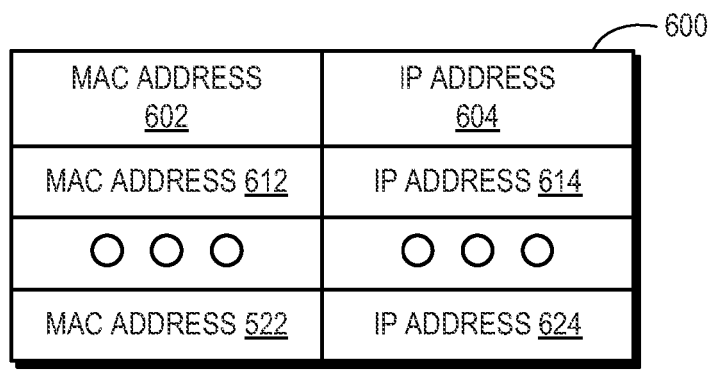
FIG. 6A illustrates an exemplary mapping table, in accordance with an embodiment of the present invention.

FIG. 6A illustrates an exemplary mapping table, in accordance with an embodiment of the present invention. A master node in a URF knows the identifiers (e.g., NSAP address and MAC address) of all nodes in the URF. To implement layer-3 services in the URF, the master node assigns a layer-3 network address, such as an IP address, to a respective node in the URF. The master node maps an IP address to a corresponding MAC address and creates a mapping table 600 which contains the mapping between MAC address 602 and IP address 604. For example, suppose that MAC address 612 corresponds to node 112 in FIG. 1A. Then, node 112 also has an IP address 614. Similarly, suppose that another node 114 has a MAC address 622. Then node 114 also has an IP address 624.

Figure 6B:
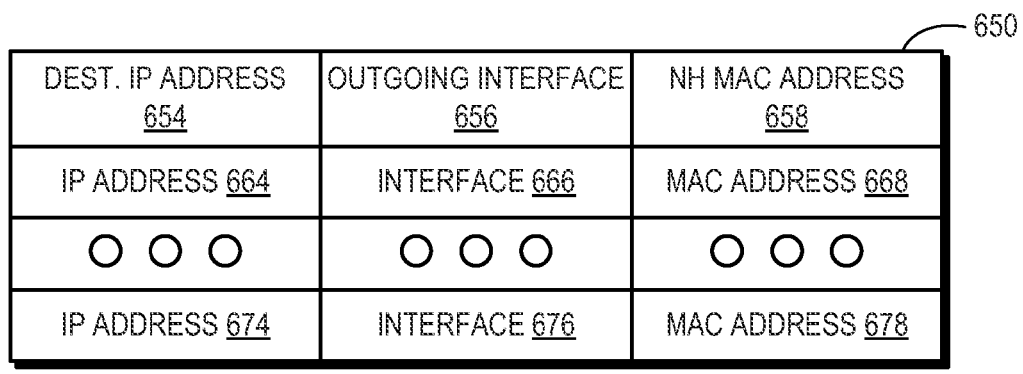
FIG. 6B illustrates an exemplary layer-3 forwarding table, in accordance with an embodiment of the present invention.

FIG. 6B illustrates an exemplary layer-3 forwarding table, in accordance with an embodiment of the present invention. After creating the mapping table, as described in conjunction with FIG. 6A, a master node distributes the mapping table to all the slave nodes in the URF. Upon receiving the mapping table, a respective slave node retrieves the local switching table, as described in conjunction with FIG. 5, and creates a layer-3 forwarding table 650 by replacing the MAC address of a respective entry of the switching table with the corresponding IP address from the mapping table. Typically, table 650 contains an entry for a respective destination node identified by a destination IP address 654, an outgoing interface 656 that couples the slave node to a next-hop node of a destination node identified by IP address 654, and a MAC address 658 of the next-hop node. For example, if an IP address 664 identifies a node in the URF, then the next-hop node has a MAC address 668, and can be reached via interface 666. Similarly, if an IP address 674 identifies another node in the URF, then the next-hop node has a MAC address 678, and can be reached via interface 676.

Figure 7A:
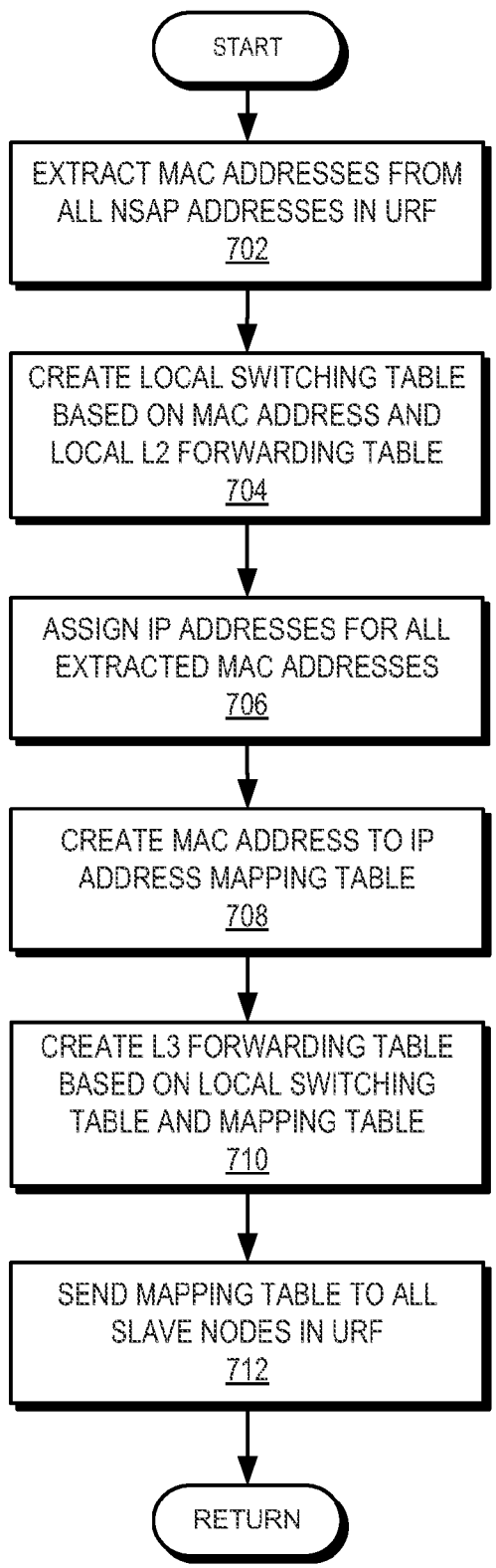
FIG. 7A presents a flowchart illustrating the process of a master node creating a layer-3 forwarding table and distributing a mapping table, in accordance with one embodiment of the present invention.

FIG. 7A presents a flowchart illustrating the process of a master node creating a layer-3 forwarding table and distributing a mapping table, in accordance with one embodiment of the present invention. During the process, the master node first extracts the MAC addresses from the NSAP addresses of all the nodes in a URF (operation 702), and creates a local switching table (e.g., for the master node) based on the extracted MAC addresses and a local layer-2 forwarding table (operation 704), as described in conjunction with FIG. 5. The master node then assign IP addresses for all corresponding MAC addresses (operation 706) and creates a mapping table which contains a mapping between the MAC addresses and the IP addresses, as described in conjunction with FIG. 6A (operation 708). The master node creates a local layer-3 forwarding table based on the local switching table and the mapping table (operation 710), as described in conjunction with FIG. 6B. The master node finally sends the mapping table to all slave nodes in the URF (operation 712).

Figure 7B:
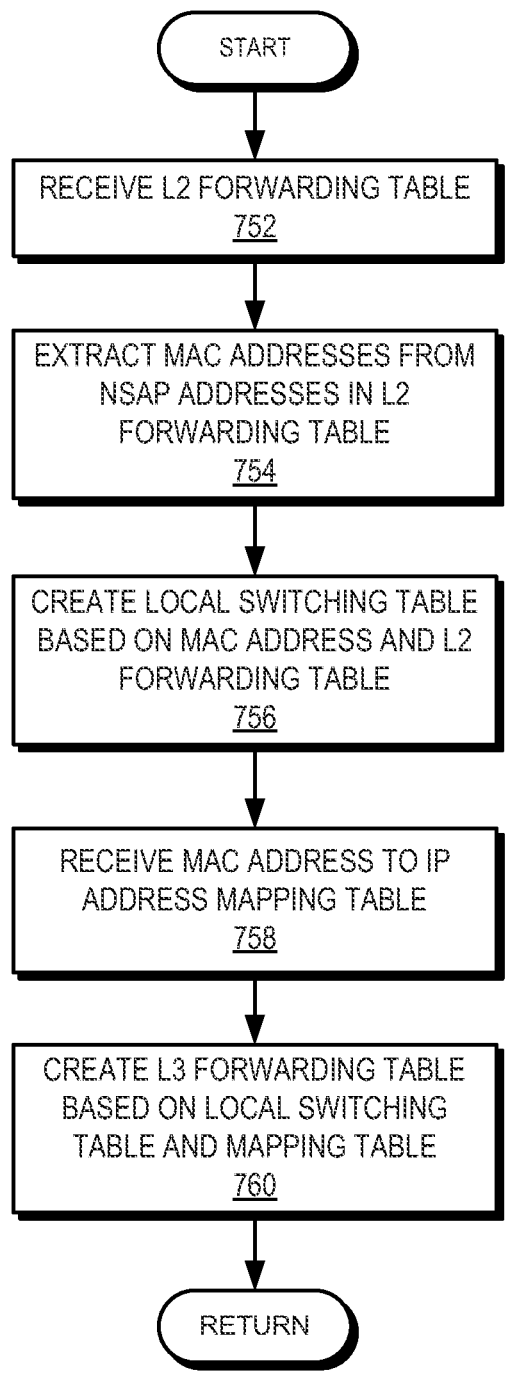
FIG. 7B presents a flowchart illustrating the process of a slave node receiving a mapping table and a layer-2 forwarding table, and creating a layer-3 forwarding table, in accordance with one embodiment of the present invention.

FIG. 7B presents a flowchart illustrating the process of a slave node receiving a mapping table and a layer-2 forwarding table, and creating a layer-3 forwarding table, in accordance with one embodiment of the present invention. During the process, the slave node first receives a layer-2 forwarding table from the master node of a URF, as described in conjunction with FIG. 3 (operation 752). The slave node then extracts the MAC addresses from all the NSAP addresses of the layer-2 forwarding table (operation 754), and creates a local switching table (e.g., for the slave node) based on the extracted MAC addresses and a local layer-2 forwarding table (operation 756), as described in conjunction with FIG. 5. The slave node then receives a mapping table from the master node containing MAC address to IP address mappings (operation 758) and creates a local layer-3 forwarding table based on the received mapping table and the local switching table, as described in conjunction with FIG. 7A (operation 760).

Exemplary System

Figure 8:
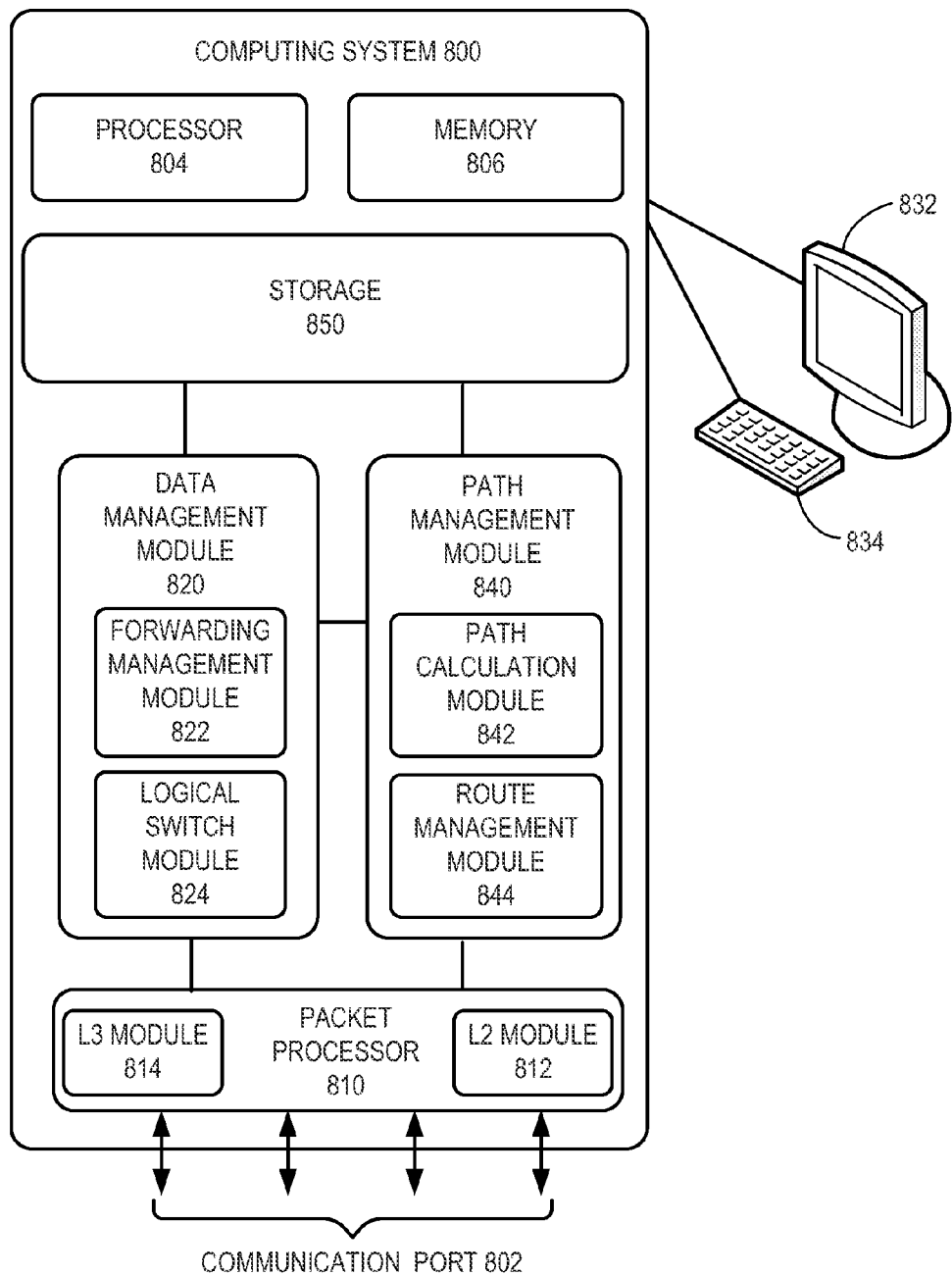
FIG. 8 illustrates an exemplary computing system, in accordance with one embodiment of the present invention.

FIG. 8 illustrates an exemplary computing system, in accordance with one embodiment of the present invention. In this example, computing system 800 includes a number of communication ports 802, which can transmit and receive data frames. Also included in system 800 are a processor 804, a memory 806, a packet processor 810, a data management module 820, a path management module 840, and a storage 850. Data management module 820 further includes a forwarding module 822 and a logical switch module 824. Path management module 840 further includes a path calculation module 842 and a route management module 844. In some embodiments, system 800 is coupled to a display device 832 and an input device 834.

During operation, processor 804 executes operational instructions from memory 806. In some embodiments, the operational instructions are based on a switch image running on system 800. During operation, packet processor 810 sends a packet to a remote node via one of the communication ports 802. If the packet is a layer-2 frame, layer-2 module 812 creates the frame header. If the packet is a layer-3 packet, layer-3 module 814 creates the packet header. Packet processor 810 inserts the contents of the packet from data management module 820. In some embodiments, logical switch module 824 operates the system in conjunction with the remote node as a single logical switch. If the packet is from another node, forwarding module 822 forwards the packet to the remote node.

Path calculation module 842 calculates the shortest path to the remote switch, and path management module 840 creates a layer-2 forwarding table based on the shortest path and stores the table in storage 850. Route management module 844 assigns a layer-3 network address to the remote switch. Route management module 844 also creates a layer-3 forwarding table based on the assigned address and the layer-2 forwarding table, and stores the table in storage 850. Depending on the entries in the layer-2 forwarding table, data management module 820, in conjunction with packet processor 810, exchanges data with the remote node via one of the communication ports 802.

In summary, embodiments of the present invention provide a computing system and a switch. The computing system includes a processor, a memory, a logical switch management mechanism, and a layer-2 path management mechanism. The logical switch management mechanism operates the computing system in conjunction with a plurality of remote switches as a single logical switch. The layer-2 path management mechanism includes a path calculation mechanism and a layer-2 forwarding table. The path calculation mechanism calculates layer-2 shortest paths among the computing system and the remote switches. The layer-2 forwarding table is for a first switch in the plurality of remote switches and created based on one or more of the shortest paths, wherein a respective entry in the forwarding table corresponds to a layer-2 network address. The layer-2 path management mechanism suppresses advertisement of the shortest paths outside of the logical switch, thereby hiding internal paths of the logical switch. The switch includes a configuration management mechanism, a logical switch management mechanism, and a data management mechanism. The configuration management mechanism configures the switch based on received configuration information from a remote system, thereby allowing the remote system to control the switch. The logical switch management mechanism operates the switch in conjunction with a plurality of remote switches as a single logical switch based on the received configuration information. The data management mechanism receives a layer-2 forwarding table from the remote system, wherein a respective entry in the forwarding table corresponds to a layer-2 network address and suppresses advertisement of the forwarding table outside of the logical switch, thereby hiding internal forwarding of the logical switch.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A computing system, comprising:
   a processor;
   a memory coupled with the processor;
   a logical switch management module coupled with the processor and configured to operate the computing system in conjunction with a plurality of remote switches as a single logical switch;
   a layer-2 path management module coupled with the processor, comprising:
      a path calculation module configured to calculate one or more layer-2 shortest paths among the computing system and the plurality of remote switches; and
      a layer-2 forwarding table, for a first switch in the plurality of remote switches, based on the one or more shortest paths, wherein a respective entry in the layer-2 forwarding table corresponds to a layer-2 network address; and
   a layer-3 route management module coupled with the processor, configured to:
      map a respective layer-2 network address in the layer-2 forwarding table to a layer-3 network address; and
      update a respective entry in a local layer-3 forwarding table in response to a change in a local layer-2 forwarding table;
   wherein the layer-2 path management module is configured to suppress advertisement of the shortest paths outside of the logical switch.

2. The computing system of claim 1, further comprising a data management module configured to send the layer-2 forwarding table to the first switch.

3. The computing system of claim 1, further comprising a forwarding module configured to forward a received packet to a switch in the plurality of remote switches based on the layer-2 forwarding table.

4. The computing system of claim 1, wherein while calculating the one or more layer-2 shortest paths, the layer-2 path management module is configured to use Intermediate System to Intermediate System (IS-IS) protocol.

5. The computing system of claim 1, wherein the layer-2 path management module is further configured to update a respective entry in the layer-2 forwarding table in response to a change in the logical switch.

6. The computing system of claim 1, wherein the layer-3 route management module is further configured to send mapping information to the first switch.

7. The computing system of claim 1, wherein the layer-3 route management module is further configured to create the local layer-3 forwarding table based on the mapping and the local layer-2 forwarding table.

8. A computer-executable method, comprising:
   operating a computing system in conjunction with a plurality of remote switches as a single logical switch;
   calculating one or more layer-2 shortest paths among the computing system and the plurality of remote switches;
   creating a layer-2 forwarding table, for a first switch in the plurality of remote switches, based on the one or more shortest paths, wherein a respective entry in the layer-2 forwarding table corresponds to a layer-2 network address;
   mapping a respective layer-2 network address in the layer-2 forwarding table to a layer-3 network address;
   updating a respective entry in a local layer-3 forwarding table in response to a change in a local layer-2 forwarding table; and
   suppressing advertisement of the shortest paths outside of the logical switch.

9. The method of claim 8, further comprising sending the layer-2 forwarding table to the first switch.

10. The method of claim 8, further comprising forwarding a received packet to a switch in the plurality of remote switches based on the layer-2 forwarding table.

11. The method of claim 8, further comprising using Intermediate System to Intermediate System (IS-IS) protocol while calculating the one or more layer-2 shortest paths.

12. The method of claim 8, further comprising updating a respective entry in the layer-2 forwarding table in response to a change in the logical switch.

13. The method of claim 8, further comprising sending the mapping information to the first switch.

14. The method of claim 8, further comprising creating the local layer-3 forwarding table based on the mapping and the local layer-2 forwarding table.

15. A switch, comprising:
   a configuration management module to configure the switch based on received configuration information from a remote system;
   a logical switch management module configured to operate the switch in conjunction with a plurality of remote switches as a single logical switch based on the received configuration information; and
   a data management module configured to:
      receive a layer-2 forwarding table from the remote system, wherein a respective entry in the layer-2 forwarding table corresponds to a layer-2 network address;
      receive a mapping between a respective layer-2 network address in the layer-2 forwarding table and a layer-3 network address from the configuring system; and
      suppress advertisement of the forwarding table outside of the logical switch; and
   a layer-3 route management module configured to update a respective entry in a layer-3 forwarding table in response to a change to the layer-2 forwarding table.

16. The switch of claim 15, further comprising a forwarding module configured to forward a received packet to a switch in the plurality of remote switches based on the layer-2 forwarding table.

17. The switch of claim 15, wherein the data management module is further configured to receive an updated layer-2 forwarding table from the configuring system.

18. The switch of claim 15, wherein the layer-3 route management module is configured to create the layer-3 forwarding table based on the mapping and the layer-2 forwarding table.

* * * * *